(12) United States Patent
Eckstein (10) Patent No.: US 6,347,567 B1
(45) Date of Patent: Feb. 19, 2002

(54) COVERT AERIAL ENCAPSULATED MUNITION EJECTION SYSTEM

(76) Inventor: Donald B. Eckstein, 5123 Bradfield Dr., Annandale, VA (US) 22003

( * ) Notice: Subject to any disclaimer, the term of this patent is extended or adjusted under 35 U.S.C. 154(b) by 0 days.

(21) Appl. No.: 09/564,242

(22) Filed: May 4, 2000

(51) Int. Cl.[7] .............................. B64D 1/04; F41F 5/00
(52) U.S. Cl. ..................................... 89/1.59; 89/1.801
(58) Field of Search ............................ 89/1.59, 1.801, 89/1.51

(56) References Cited

U.S. PATENT DOCUMENTS

| | | | | |
|---|---|---|---|---|
| 1,172,542 | A | * 2/1916 | McMullen | 89/1.52 |
| 2,447,941 | A | * 8/1948 | Imber et al. | 102/7.2 |
| 4,106,875 | A | * 8/1978 | Jewett | 403/2 |
| 4,161,301 | A | * 7/1979 | Beardsley et al. | 244/137 |
| 4,208,949 | A | * 6/1980 | Boilsen | 89/1.801 |
| 4,256,012 | A | * 3/1981 | Cowart et al. | 89/1.816 |
| 4,372,215 | A | * 2/1983 | Crepin | 102/387 |
| 4,474,101 | A | * 10/1984 | Boulard et al. | 89/1.5 |
| 4,923,148 | A | * 5/1990 | Fillingham et al. | 244/137 |
| 5,396,977 | A | * 3/1995 | Lantis et al. | 198/371 |
| 5,763,811 | A | * 6/1998 | Ruzicka | 89/1.51 |

* cited by examiner

Primary Examiner—Charles T. Jordan
Assistant Examiner—M. Thomson
(74) Attorney, Agent, or Firm—Robert M. Downey, P.A.

(57) ABSTRACT

A system for launching precision guided munitions (PGMs), artillery rockets/missiles, and cruise missiles from an aircraft includes a mobile unit having a storage compartment provided with a rack assembly arranged to define multiple tiers for storing munition ejection containers (MECs) therein. An elevator apparatus raises and lowers a tray between the tiers in order to load and remove the MECs from predetermined storage positions on the multiple tier rack assembly. Each MEC is structured to encapsulate one or more PGMs, artillery rockets/missiles, or cruise missiles and includes forward and rear end plates attached to longitudinal side panels. Pre-formed packing inserts protectively surround and stabilize the missile(s) contained in the MEC. An ejection ramp extends from the aft end of the mobile unit for individually directing the MECs through a cargo door of the aircraft for ejection therefrom. Once ejected, the MEC end plate unlocks, which causes the end plates, side panels, and packing inserts to be stripped from the encapsulated munition(s) by the wind blast, thereby enabling the PGMs, rockets, or missiles to assume an aerodynamic flight attitude while following a pre-programmed flight path to a designated target.

20 Claims, 9 Drawing Sheets

COVERT AERIAL ENCAPSULATED MUNITION EJECTION SYSTEM

BACKGROUND OF THE INVENTION

1. Field of the Invention

The present invention relates to a system for launching precision guided munitions (PGMs), artillery rockets/missiles, and cruise missiles from an aircraft and, more particularly, to a highly efficient, cost-effective system for launching the same from tail loading cargo aircraft. According to the system of the present invention, PGMs, artillery rockets/missiles, and/or cruise missiles are packaged in munition ejection containers containers (MECs), arranged in a storage rack in the cargo hold of the aircraft and individually launched from the cargo door of the aircraft, whereupon the container is subjected to wind forces which strip the container from the munition(s) contained therein. With the container and various packaging inserts removed, the munition(s) can assume a flight path towards a designated target.

2. Discussion of the Related Art

The first known use of ground attack aviation occurred during World War I when bi-plane pilots, initially shooting each other with pistols, later progressed to dropping hand grenades on enemy ground troops. In subsequent years, anti-aircraft defense technologies continued to improve, as fighter and bomber aircraft, and the weapons they carried, grew more capable, sophisticated, lethal and expensive. In an effort to increase the effect of aerial munitions, precision guided munitions and cruise missiles were developed to avoid ground-based defenses and to increase the probability of killing the target with one aircraft sortie and one weapon. Unfortunately, the constant research and development needed to increase the survivability and effectiveness of fighter and bomber aircraft, and the weapons carried on these aircraft, has grown increasingly and, in some instances, prohibitively expensive.

The United States Air Force (USAF) currently uses dedicated fighter aircraft (e.g., the F-15E, F-16, and F-117) and bomber aircraft (e.g., the B-52, B-1, and B-2) to deliver bombs, missiles and precision guided munitions (PGMs) against ground targets. These aircraft, which are limited in number, are all considerably costly to manufacture, fly and maintain. Accordingly, their use as a platform to launch cruise missiles in a stand-off scenario, wherein enemy threat to the aircraft is minimal, amounts to a highly uneconomical and inefficient use of defense resources. It is, therefore, not surprising that despite the desire to acquire precision guided munitions (PGMs) and cruise missiles, the air forces of many countries are deterred from doing so due to the expense of purchasing and maintaining the sophisticated fighter or bomber aircraft required to deploy these weapons.

Fighter aircraft, such as the F-15E or F-117, which are capable of flying at night and in bad weather and surviving against the most capable enemy air defense systems ever developed and deployed, cost more than $50 million per aircraft to produce and thousands of dollars an hour to fly. Moreover, currently used fighter aircraft require highly sophisticated and expensive logistics support systems. At present, the USAF maintains only about 52 F-117 fighter aircraft and 200 F-15E fighter aircraft in inventory. And, while the B-52 bomber cost only about $10 million when produced in the early 1960's, these large aircraft are extremely expensive to fly and support due to their 8 jet engines and the maintenance required to support their aging air frames. Even more expensive are the B-1 and B-2 bombers which typically cost anywhere from 5 to 20 times more per flight hour to support than the F-15E and F-117 fighters.

To further complicate matters, the USAF uses a different cruise missile than the United States Navy (USN), resulting in increased costs of developing, producing and supporting the systems of each military branch. Both the USAF and USN have a long history of researching, developing, testing and producing different weapon systems that achieve the same end using different launch platforms. For instance, the USAF uses inter-continental ballistic missiles (ICBM's) and air launched cruise missiles (ALCMs) and its conventional war head variant (CALCM), while the USN uses submarine launched ballistic missiles (SLBMs) and the Tomahawk land attack missile (TLAM). These practices have been justified in the past due to the radically different environments in which these systems have been deployed. The differences between the USN TLAM and the USAF CALCM launch platforms offers an excellent illustration of the challenge of developing a common weapons system that will meet the diverse needs of both services. For instance, the USN is able to launch the same basic TLAM missile several different ways from both submarine and surface ship platforms, and a variety of missiles in a dense format from a single launch system. The USAF, on the other hand, is presently limited to use of expensive and somewhat limited numbers of bomber and fighter aircraft to deploy similar weapons.

On most fighter and bomber aircraft, weapons can be carried either externally or internally. External carriage on aircraft allows more weapons to be carried, but with several disadvantages. In particular, the carriage of weapons externally creates considerable aerodynamic drag, which significantly reduces the payload/range of the aircraft. These aerodynamic loads also impose considerable stress and vibration on the weapon. Other factors to consider are the size, weight, and shape of the weapon, in addition to the number of weapons carried, their position on the pylon, other external stores carried, air speeds flown, etc. These and other factors must be carefully modeled, and the different external stores configurations need to be flight tested in a variety of mission profiles, to ensure that the aircraft and PGM reliability are not compromised. External weapon carriage also significantly increases the radar return of the aircraft. For this reason, the modern and more stealthy aircraft, such as the B-1 and B-2 bombers and the F-22 fighter use only internal weapon carriage.

While internal weapon carriage is far more efficient from aerodynamic (range/payload) and radar signature points of view, it is very inefficient from a payload volumetric density perspective. Each ALCM weighs about 3,000 pounds and their rotary launcher about the same, with the combined installed payload of 8 rotary launched missiles weighing about 27,000 pounds. This figure would double to approximately 54,000 pounds when 16 ALCMs on rotary launchers are installed in the B-2 bomber, which is an impressive payload. However, it is operationally unlikely that 16 ALCMs would be carried simultaneously due to the need to employ other PGMs during the same mission, which weigh only about 2,000 pounds each. The smaller PGM payloads, using the same rotary launchers, would then limit the bomber to only 16 PGMs, significantly less than the air frame's maximum payload capacity if the munitions were carried in a more efficient format. The use of other types of munition racks (e.g., in the B-52, B-1 and B-2 bombers) allows the loading of large numbers of smaller munitions, but munition types cannot be mixed in the same payload bay. Thus, the potential load configurations and employment options are limited.

Another factor to consider is the limited operational availability of the USAF bomber inventory. Present reports show an inventory of 90 B-52 bombers, 90 B-1 bombers, and 21 B-2 bombers. This total of approximately 200 bombers is significantly reduced by aircraft undergoing short or long term maintenance, modifications, flight testing, and crew training, which typically leaves only 100–120 available aircraft at any one time for deployment and combat operations.

A further disadvantage of using bomber aircraft to deliver cruise missiles or other PGMs, beyond the expense and limited number of available bombers, is their extreme visibility which causes neutral parties, and even allies, to deny over-flight and basing rights. Additionally, bombers require long runways and extensive support facilities, which limits their potential deployments to a relatively small number of allied air bases.

Military transports, on the other hand, are less imposing on foreign allies and are more plentiful in numbers. For instance, the USAF uses military transports such as the C-130, C-141, C-17 and C-5. These aircraft are frequently in and out of numerous foreign military and civilian air fields on a daily, routine basis. This is especially true of the C-130. Due to their relatively small size (in comparison to the B-52 bomber), short take off and landing (STOL) ability, and rugged, low cost airframe (currently about $60–70 million each), C-130's are used for a variety of Department of Defense missions. In addition to the several hundred C-130's flown by the USAF Active Duty, Reserve, and Air National Guard Units, this is one of the most common aircraft in foreign air force inventories, with hundreds currently being flown in several dozen countries. In fact, the USAF currently maintains approximately 600 C-130's, which is three times more numerous than the current USAF bomber inventory. Additionally, the USAF maintains approximately 200 C-141's and C-17's and 120 C-5's in inventory.

In summary, the air forces of the United States and many other foreign countries are caught in a fundamental dilemma. While Navy cruise missiles like the TLAM are encapsulated, stored in a vertical launch tube, and employed from a wide variety of platforms with a minimum of support, air forces are left deploying long range land attack cruise missiles on large, expensive aircraft like the B-52, B-51 and B-2 bombers, which are only available in limited numbers. Cruise missiles with ranges of 600 or more nautical miles do not require expensive penetration technologies found on bomber aircraft, yet these are the only air frames which are presently being used to launch these munitions. Cargo aircraft, such as the C-130, on the other hand, exist in large numbers, are inexpensive to acquire and maintain, can be used for multiple missions, and are so common that their appearance or over-flight draws no attention from civilians or government.

Accordingly, there is an urgent need to provide a more efficient and cost effective means for launching PGM, artillery rockets/missiles, and cruise missiles from aircraft. More specifically, there is a need for a convenient method to store, support, and launch existing PGM, artillery rockets/missiles, and cruise missiles from C-130 and other larger military transport aircraft, thereby providing tremendous acquisition, support and operational efficiencies without compromising the current fighter or bomber force structure or an air force's ability to respond to mission taskings which rely heavily on fighter and bomber support.

OBJECTS AND ADVANTAGES OF THE INVENTION

With the foregoing discussion in mind, it is a primary object of the present invention to provide a highly efficient and cost-effective system for launching cruise missiles from aircraft other than fighter or bomber aircraft.

It is a further object of the present invention to provide a system for air launching inertially guided artillery rockets and missiles from transport/cargo aircraft, thereby greatly increasing air force munition and attack options.

It is still a further object of the present invention to provide a system for launching a variety of munitions from a military transport aircraft, such as a C-130, C-141, C-17 or C-5.

It is still a further object of the present invention to provide a system for launching PGMs, artillery rockets/missiles, and cruise missiles from a transport/cargo aircraft, thereby providing large payload and extended range capabilities.

It is still a further object of the present invention to provide a system for launching PGMs, artillery rockets/missiles, and cruise missiles from an aircraft which is more cost effective and efficient to fly than a bomber or fighter aircraft, particularly in a permissive air environment.

It is yet a further object of the present invention to provide a system for launching PGMs, artillery rockets/missiles, and cruise missiles from a transport/cargo aircraft, thereby reducing attention drawn from civilians and foreign governments and increasing the likelihood of over-flight and/or basing rights in neutral and in foreign ally countries.

It is still a further object of the present invention to provide a system for launching PGMs, artillery rockets/missiles, and cruise missiles from a transport/cargo aircraft which provides increased acquisition, supports, and operational efficiencies without compromising an air force's fighter or bomber force structure or its ability to respond to mission taskings which rely heavily on fighter and bomber support.

These and other objects and advantages of the present invention are more readily apparent with reference to the following disclosure and accompanying drawings.

SUMMARY OF THE INVENTION

The present invention is directed to a system for launching precision guided munitions (PGMs), artillery rockets/missiles, and cruise missiles from an aircraft. The system includes a mobile unit having a storage compartment provided with a rack assembly arranged to define multiple tiers for storing munition ejection containers (MECs) therein. An elevator apparatus raises and lowers a tray between the tiers in order to load and remove the MEC's from predetermined storage positions on the multiple tier rack assembly. Each MEC is structured to encapsulate one or more PGMs, artillery rockets/missiles, or cruise missiles and includes forward and rear end plates attached to longitudinal side panels. Pre-formed packing inserts protectively surround and stabilize the missile(s) contained in the MEC. An ejection ramp extends from the aft end of the mobile unit for individually directing the MEC's through a cargo door of the aircraft for ejection therefrom. Once ejected, the MEC end plate unlocks, which causes the end plates, side panels, and packing inserts to be stripped from the encapsulated munition(s) by the wind blast, thereby enabling the PGMs, rockets, or missiles to assume its designed aerodynamic flight attitude in following a pre-programmed flight path to a designated target.

BRIEF DESCRIPTION OF THE DRAWINGS

For a fuller understanding of the nature of the present invention, reference should be made to the following detailed description taken in conjunction with the accompanying drawings, in which.

Like reference numerals refer to like parts throughout the several views of the drawings.

DETAILED DESCRIPTION OF THE PREFERRED EMBODIMENTS

The covert aerial encapsulated munition ejection system (CAEMES), including components thereof, is shown throughout the several views of the drawings and is generally indicated as 10. CAEMES 10 is a self-contained munition storage, targeting, and launching system housed within a mobile unit 12. The mobile unit 12 is provided with a battery powered drive train and steerable wheels 90, thereby enabling the system to be driven into and out from the cargo hold of a tail loading transport such as a C-130, C-141, C17, or C-5. For purposes of this disclosure, the CAEMES unit 12 is designed to conform with the internal dimensions of a C-130 cargo compartment, which is 40 feet (480 inches) long, 9 feet (108 inches) high, and 10.3 feet (124 inches) wide. These dimensions serve as a template for the maximum potential cubic area (38 feet long, 106 inches high, and 118 inches wide) that a CAEMES unit 12 would occupy for use in a C-130 cargo/transport aircraft. The same CAEMES unit 12 can be installed in a C-141 or C-17 aircraft. However, when used in these larger aircraft, a longer loading/ejection ramp 60 (described in more detail hereinafter) needs to be installed so that the aircraft center of gravity limits are not exceeded at higher gross loaded weights of the CAEMES unit 12.

The mobile CAEMES unit 12 includes a forward section 14, a central section 16, and an aft section 18. The forward section 14 is provided with a modular compartment 15 (approximately 7 feet wide, 7 feet high, and 6 feet deep) attached to, or integral with, the forward end of the central section 16. The modular compartment 15 is structured and disposed to accommodate two weapon system operators (WSO's) and includes operational controls for avionics systems such as VHF/UHF/HF radios, GPS, video cameras, infrared/thermal imaging cameras, synthetic aperture or ground mapping radar, laser range finders and laser designators. These avionics systems are operated by the two WSO's in the modular compartment 15.

Figure 4:
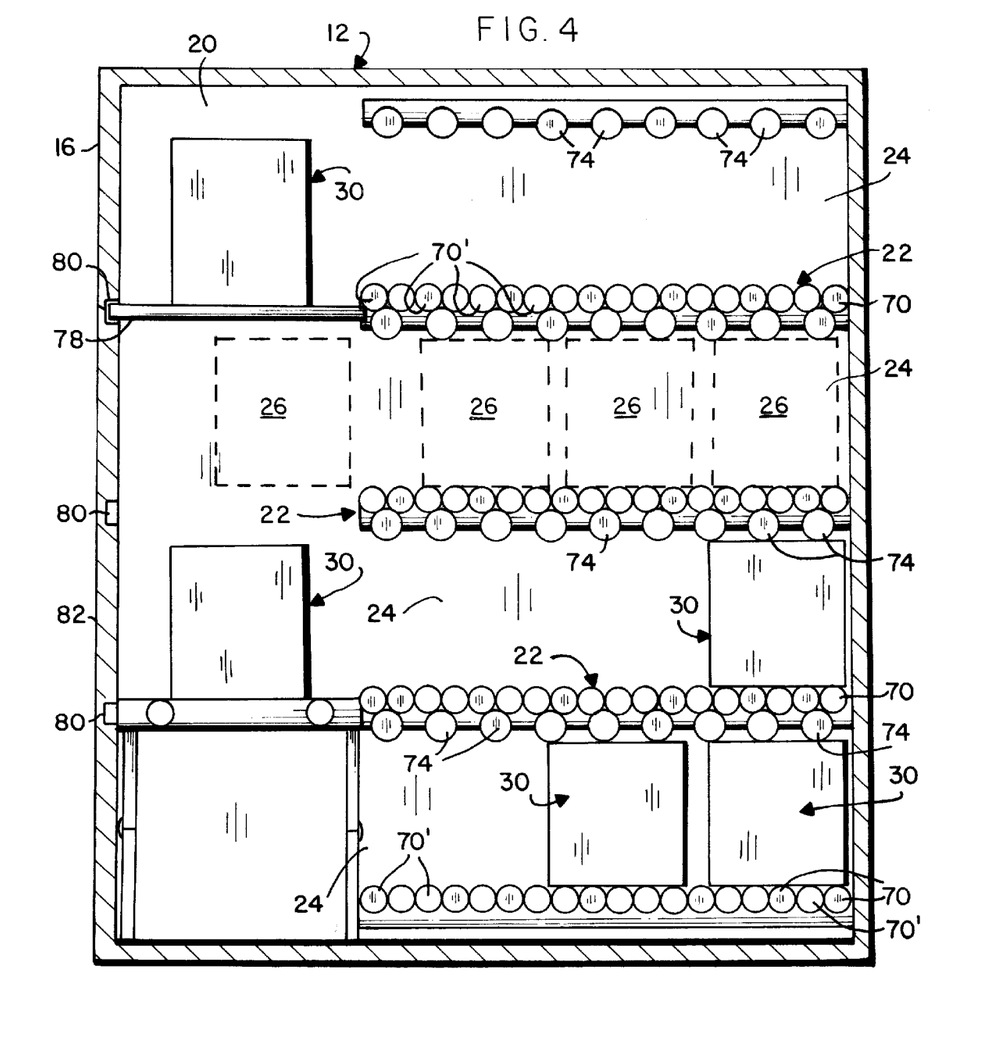
FIG. 4 is a rear elevational view showing the munitions storage compartment and rack assembly in accordance with a preferred embodiment of the invention.

The central section 16 of the unit 12 includes a munitions storage compartment 20 (see FIG. 4). A rack assembly 22 in the storage compartment 20 is structured to include multiple tiers 24 for storing an arrangement of munition ejection containers (MECs) 30 therein. Each munition ejection container (MEC) 30 is structured to encapsulate one or more munitions 31, such as one or more precision guided munitions (PGMs), artillery rockets/missiles, or cruise missiles. The munition ejection containers 30 each include a longitudinal side wall structure 32, a forward end plate 34 attachable to a forward end of the side wall structure 32, and an aft end plate 36 attachable to an aft end of the side wall structure. Packing inserts 38 are sized and configured for receipt within an interior chamber of the MEC 30 for protectively surrounding and stabilizing the one or more PGMs or cruise missiles contained therein. In a preferred embodiment, the packing inserts 38 are formed of polystyrene (i.e., Styrofoam), similar to the packing inserts used to support electronic appliances, such as computers, TV's, etc. within a box. The packing inserts 38 are specifically shaped to conform with the exterior configuration of the one or more missiles stored in the MEC, as well as to the dimensions of the interior chamber of the MEC 30, thereby stabilizing the munition(s) and preventing undesirable movement of the munition(s) 31 within the MEC 30 during transport. The packing inserts 38 also absorb shock and provide resistance to external pressure applied to any of the six sides of the MEC 30, thereby increasing the integrity of the MEC containers. The MEC 30 is further provided with interlocking means 40 for releasably securing the forward end plate 34 in attached position in covering relation to an open forward end of the MEC. When ejected from the aircraft, the interlocking means 40 is actuated to release the forward end plate 34 from attachment to the container 30, thereby enabling the wind force to strip the side wall structure 32, end plates 34, 36, and packing inserts 38 from the one or more munitions contained therein. Once the MEC 30 is stripped from its contents, the munitions 31 are then able to follow their programmed course or flight path to their designated targets; The detailed structure of the MEC is described more fully hereinafter in connection with several embodiments thereof.

Figure 8:
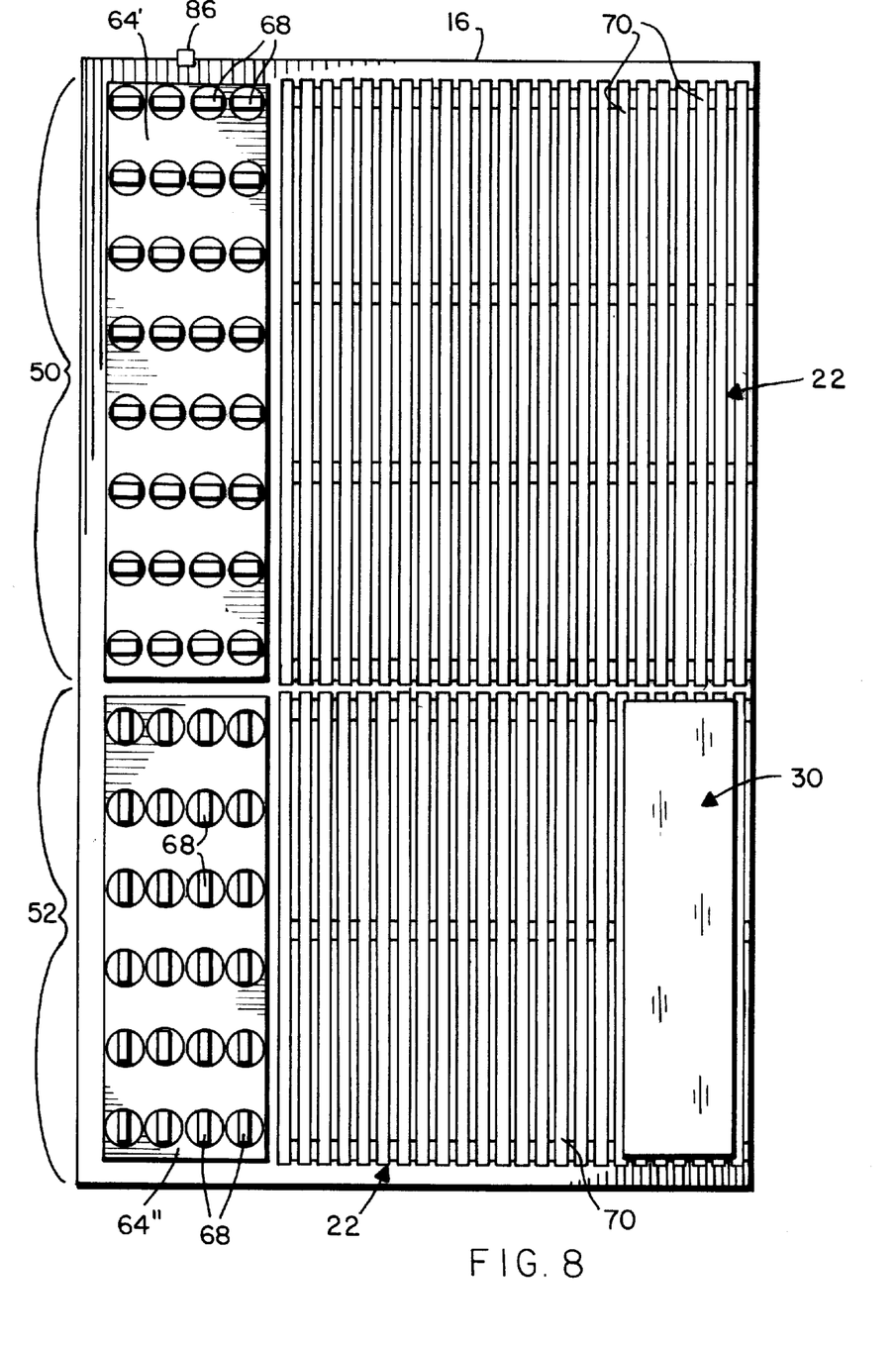
FIG. 8 is a top plan view showing one tier of the rack assembly and adjacent fore and aft elevator trays within the munitions storage compartment.
Figure 9:
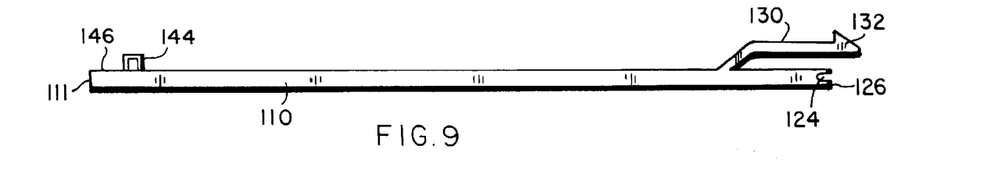
FIG. 9 is an isolated side elevational view of a side panel of a munition ejection container, in accordance with a first preferred embodiment thereof.
Figure 10:
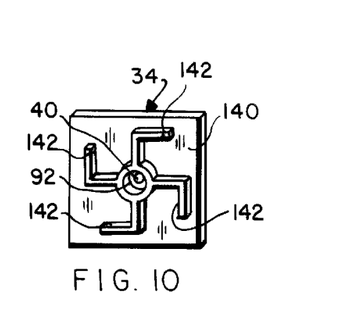
FIG. 10 is a rear perspective view of the front end plate used in conjunction with the embodiment of FIGS. 3 and 9.
Figure 11:
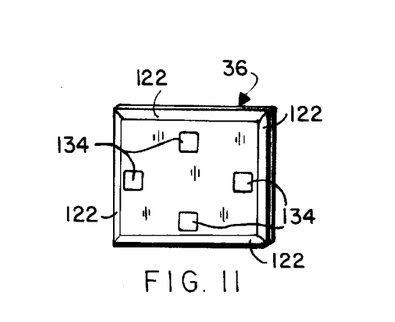
FIG. 11 is a rear perspective view of the aft end plate used in conjunction with the embodiment of FIGS. 3 and 9.

Referring to FIGS. 4 and 8, the rack assembly 22 within the munition storage compartment 20 is shown in accordance with a preferred and practical embodiment thereof. For purposes of this disclosure, the rack assembly 22 is configured using the C-130 aircraft as a model template. The rack assembly 22 can be configured to have either four storage rack tiers 24, with each tier (except the bottom tier) having four storage positions 26 (i.e., 4×4), or three storage rack tiers 24, with three storage positions 26 on each tier (i.e., 3×3). In either configuration, the far left position on the bottom tier is used to store a munition loading and ejection tray. Accordingly, this position would not be used for munition storage. The rack 22 assembly within the munition storage compartment 20 is structured and configured with contiguous forward and aft sections 50, 52 that are approximately 16 feet long and 12 feet long, respectively. When combined, the contiguous forward and aft sections 50, 52 can store a MEC 30 of up to 28 feet long in a full length storage position 26. Thus, the 4×4 design has 15 potential full length storage positions, while the 3×3 design has eight potential full length storage positions. However, since the full length storage position can accommodate two smaller MECs (one MEC in the forward section 50 and one MEC in the aft section 52), the number of munitions stored can be mixed as appropriate to the mission, with up to 30 MECs stored in the 4×4 design or 16 MECs in the 3×3 design. The MEC has a maximum cross section (width and height) of approximately 22 inches (31 inches measured diagonally, corner to corner) in the 4×4 design configuration. Alternatively, a MEC 30 used in the 3×3 rack design configuration would have a 30 inch cross section (width and height). It should be noted, however, that these specific dimensions may vary in accordance with the specific rack structure and size of the munition storage compartment 20 within the CAEMES unit 12.

In the above example, the 4×4 design of the rack assembly 22, holding MECs having a 22 inch cross section, will accommodate most of the munitions of the USN inventory to include the TLAM (20.4 inch diameter), the Harpoon missile (13.5 inch diameter), the Mark-50 torpedo (13 inch diameter), the Standoff Land Attack Missile (SLAM, 14 inch diameter), and the SLAM Extended Range missile (SLAM-ER, 14 inch diameter), with room to spare for folding control fins or wings on the missiles and packing inserts 38. The same is true of the U.S. Air Force PGMs that use the MK 82 500 pound general purpose (GP) bomb, the MK 83 1,000 GP bomb, and the MK 84 2,000 pound GP bomb, as well as the BLU-111 1,000 and BLU-109 2,000 penetrating bombs with guidance kits. For example, the Guided Bomb Unit 10 (GBU-10) laser guided MK 84 bomb has a 19 inch diameter, a 29 inch cross section folded tail fin assembly, and is less than 15 feet long. Several USAF munitions that cannot fit within a 22 inch MEC (e.g., the Joint Standoff Weapon (JSOW), Advanced Cruise Missile, etc.) can use the 30 inch MEC size in the 3×3 rack design configuration.

The Munition Ejection Containers 30 are loaded into the munition storage compartment 20 and onto the rack assembly 22 via a MEC loading and ejection ramp 60 (see FIGS. 1 and 2) that is extendable from the rack assembly 22 to a point several feet past the end of an open cargo loading ramp of the aircraft. Once loaded, the loading and ejection ramp 60 is retracted, thereby enabling the transport aircraft's cargo loading ramp and doors to be closed until just prior to ejecting one or more of the MECs 30. In this manner, there is no visual indication that the system 10 is being carried on the aircraft. When launching one or more of the MECs from the aircraft, the cargo loading ramp of the aircraft is first lowered. Next, the ejection ramp 60 is extended past the end of the cargo ramp so that the distal end portion of the ejection ramp 60 extends out approximately 1–5 feet beyond the end of the cargo ramp. An avionics sensor tower 41 can then be rotated downwardly, approximately 180° from the upright position, so that the sensor pod 46 is positioned below the aircraft where it has a 360°, unobstructed view. The avionics sensor pod 46 can be provided with VHF, UHF, and HF radio communication antennas, GPS antennas, radar antennas, E/O video cameras, IR/thermal imaging cameras, laser range finders, and laser designators. These avionics systems are operated by the two weapon systems operators in the compartment 15. The two weapons systems operators are provided with a variety of visual and control displays used to load, program, control, and launch the specific PGMs, artillery rockets/missiles, or cruise missiles being carried. All of the avionics sensors, displays, and "black boxes" required to support the munitions being carried and launched are installed in one of the three locations (i.e., the WSO control compartment 15, avionics module 100, or the external sensor pod 46). The controls and displays within the WSO control compartment 15 enable the weapons system operator to keep careful track of which MEC (and the munitions contained therein) is located in which storage position, with the ability to control and track movement and placement of the MECs within the rack assembly 22. This allows for appropriate balance of weights to maintain stability of the aircraft, while also permitting strategic positioning and selective launching of the MECs from the aircraft.

Figure 1:
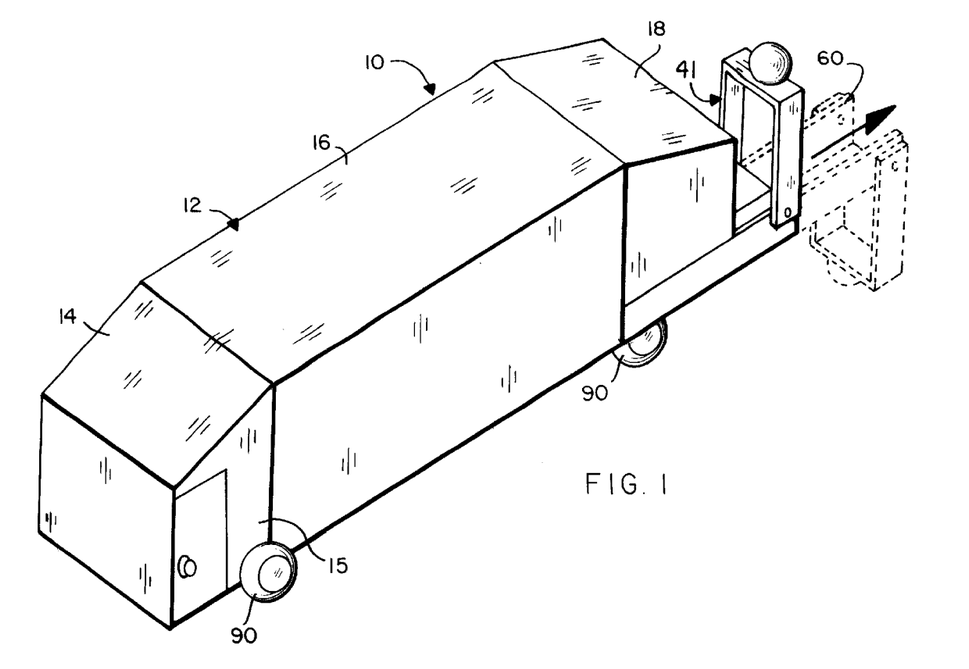
FIG. 1 is a general perspective view of the mobile unit in accordance with a preferred embodiment of the invention.
Figure 2:
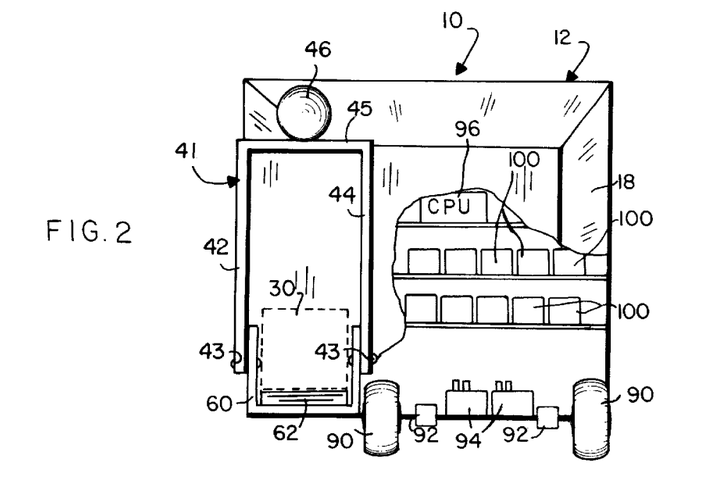
FIG. 2 is a rear elevational view of the mobile unit shown with the rear wall structure of the aft section partially cut away to illustrate electronic components which are carried in the aft section.
Figure 3:
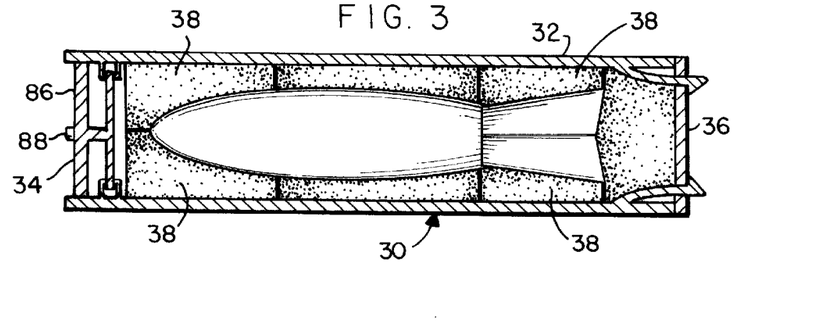
FIG. 3 is a side elevation, shown in cross section, illustrating a munition packed within a munition ejection container, in accordance with a first preferred embodiment of the invention.

As seen in FIGS. 1 and 2, the avionics sensor pod 46 is mounted on the tower 41. The tower 41 is secured to the distal end of the ejection ramp 60. Specifically, the tower 41 includes opposite, elongate legs 42, 44 which rotatably mount to the sides of the ejection ramp 60 at rotation point 43. The upper ends of the legs 42,44 connect to a mounting plate 45. The mounting plate 45 is specifically structured and disposed to facilitate support and mounting of the avionics sensor pod 46 thereon. Means are provided within the tower to run cables, electrical cords, conduits and other means for interconnecting communications between the sensor pod 56 and other systems and controls within the various locations of the unit 12, as described above.

Figure 5:
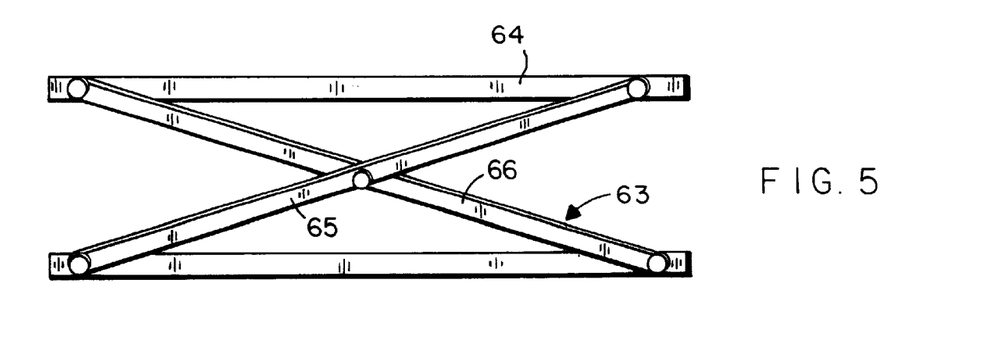
FIG. 5 is a side elevation, showing a general diagram of the scissor jack lift apparatus in accordance with a preferred embodiment of the invention, wherein the scissor jack is shown in a lowered position.
Figure 6:
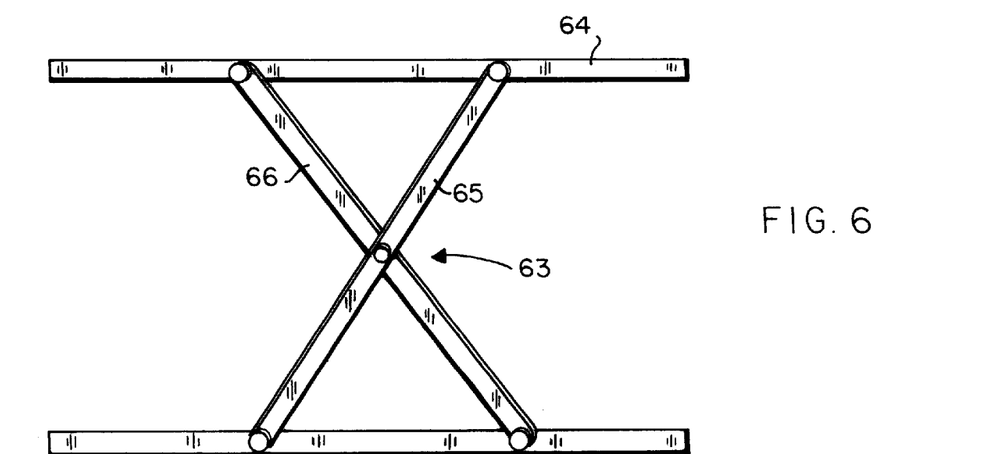
FIG. 6 is a side elevational view showing the scissor jack of FIG. 5 is a raised position.
Figure 7:
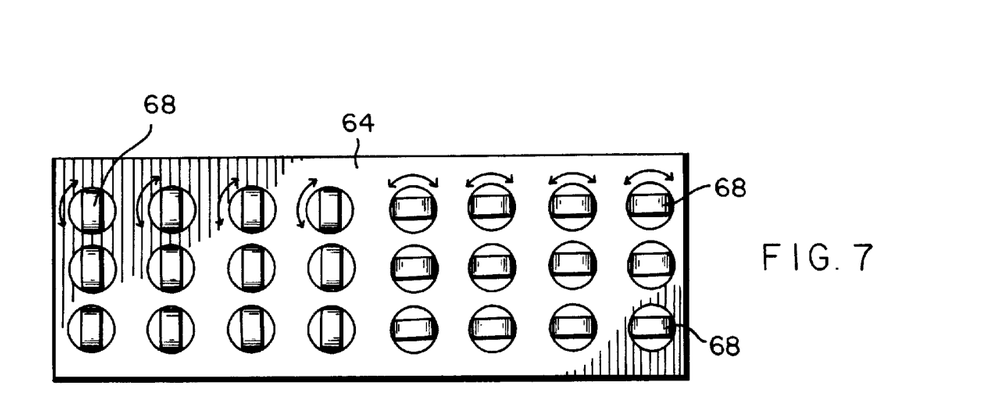
FIG. 7 is top plan view of an elevator tray in accordance with a preferred embodiment.

The loading and ejection ramp 60 contains rows of motorized rubber covered metal rollers 62 which both support the weight of the MEC 30 and move each MEC 30 forward or aft along the ramp 60. Once a MEC has moved forward along the loading and ejection ramp 60 and into the munition storage compartment 20, it rests on an elevator loading tray 64 in the left position of the bottom tier in either or both the forward 50 and/or aft 52 section of the rack assembly 22 (or both sections 50, 52 if the MEC 30 is longer than 16 feet long). Each elevator tray 64', 64" (forward and aft) has numerous rows of motorized rubber covered metal roller wheels 68, which rotate and change in directional orientation 90° from fore and aft to a side to side position. In the fore and aft position the rollers 68 are used to load or eject MECs 30 from the rack assembly 22. On the other hand, the side to side position of the rollers 68 facilitates horizontal movement of a MEC 30 from the elevator tray 64 into a specific tier 24 of the storage rack assembly 22. Both the fore and aft elevator trays 64', 64" can be raised or lowered by a lift apparatus 63 so that they are level with any of the tiers 24 of the storage rack assembly. In a preferred embodiment, the lift apparatus 63 for raising and lowering the elevator trays 64 are of a scissor jack design, with a screw drive, similar to the type commonly used in automotive repair facilities. The scissor jack design, as generally illustrated in FIGS. 5 and 6, provides an ability to reliably lift extremely heavy weights, while also having the feature of being able to compress to a very compact profile. The range of vertical movement of the scissor jack design is limited only by the length of the scissor arm members 65 of the jack 66. For purposes of the present invention, a scissor jack having 12 foot long scissor arms is more than capable of lifting a heavy MEC 30 to a height of 5.5 feet (66 inches).

Once the elevator tray 64 has lifted a MEC to a specific tier 24, the container 30 is ready to be moved laterally to a specific storage position 26 in the tier. Each tier 24 has longitudinally oriented rods 70 which are spaced 1 to 4 inches apart. The rods 70 are structured to rotate either left or right. In a preferred embodiment, alternately spaced rods 70' are covered with rubber and driven by a motorized drive means. The remaining rods are able to freely rotate and provide support to maintain each MEC 30 level as they are moved transversely along the tier 24 into a select storage position 26. As an example, 1 inch diameter rods, spaced 3 inches apart, would provide seven rods in supporting position below a 22 inch cross section MEC, at any one time, with at least three of the rods being driven. In this example, each section of seven rods would correspond to approximately one munition storage position to be occupied by a MEC 30. To move a MEC 30 from the elevator tray 64, at the far left of the rack assembly 22, to a storage position at the far right of the rack assembly, all of the driven rollers on that storage tier 24 would be required to rotate to the right, to effectively carry the MEC 30 transversely across the tier 24. In a preferred embodiment, the top of each storage tier 24 is provided with longitudinally oriented guidance rollers 74. These rollers 74 are not driven and are not intended to support the weight of the MEC 30. Instead, these rollers 74 are strictly used to keep the MEC properly positioned in the storage tier 24, allowing only lateral (side ways) movement and preventing the MECs in each respective tier from rolling, yawing, or pitching within the rack assembly 22 in response to aircraft movement. While not shown, it may be desirable to provide a retractable flange or plate between the fore and aft storage sections 50, 52 at each tier 24 in order to prevent forward, aft or yaw movement of MECs in response to maneuvering of the aircraft. The use of numerous support and drive rollers 70, 71' on each storage tier 24, with minimal friction between the rollers and MEC, enables even extremely heavy MECs to be quickly positioned and stored within the rack assembly 22 until an individual MEC 30 is selected for ejection.

The far left storage positions on each tier form a vertical column to accommodate vertical movement of the lift apparatus 63 and travel of the elevator trays 64 to each storage tier. Thus, the far left storage positions at each tier cannot be provided with support and drive rollers as described above. Instead, these storage positions, on the second tier and above, use laterally retractable pins 78 that store in the space between each storage tier's longitudinal drive and support rollers. These retractable pins 78 extend from the rack 22 of each tier 24 and below a MEC 30 lifted to that position. When extended, the pins insert into a load bearing hole 80 in the side wall 82 of the CAEMES unit 12. To store a MEC 30 in a far left position or "pin position" at any tier level except the bottom tier, the elevator tray 64 is raised to that tier level, and the pins 78 at that level are extended between the elevator tray rollers 68 and into the load bearing holes 80 on the wall 82. If a short MEC is being stored, either in the forward section 50 or aft section 52, then only one of the elevator platforms 64' or 64" is used. For instance, if a short MEC is being placed into a pin position in the forward section 50, then the aft elevator platform 64" is used to raise and move the MEC. The same is true when removing the short MEC for repositioning in the rack assembly or when ejecting that particular MEC. Once the pins 78 are extended below the MEC, the tray 64 can then be lowered so that the MEC 30 rests on the extended pins 78. Obviously, once a MEC is stored at a tier pin position, it must first be moved to another location before any of the other MEC's on that tier can be accessed. When the rack assembly 22 is fully loaded (with all of the storage positions, including pin positions, occupied), only two long (greater than 16 feet long) rounds or four short (12 or 16 feet long) rounds can be immediately accessed for ejection. However, due to gross take off weight and payload/range limitations of the aircraft, it is unlikely that all of the pin storage positions would be used on a frequent basis. As fewer pin positions are used for storing MEC's, the ability to access, reposition, and/or eject individual MEC rounds increases dramatically. For example, when only the top tier pin position is occupied, a total of 26 short MECs can be stored at one time, with 8 MECs being immediately accessible.

The forward wall of the CAEMES unit is provided with retractable electrical receptacles 86, at each of the pin positions in the forward section of the rack assembly. These receptacles mate with electrical receptacles 88 located at the forward end plate 34 of the MECs 30. This allows the munition(s) stored in the MEC round to communicate with the appropriate avionics modules so that flight plans, GPS coordinates, etc. can be loaded. This feature allows up to three 30 inch or four 22 inch MEC rounds to be programmed or updated, simultaneously, just prior to being ejected from the GAEMES unit. Once the munitions in the three or four MEC's are programmed, updated and ready for launch (i.e., "hot"), up to four MECs 30 can be ripple launched from the CAEMES unit 12 in a manner of seconds.

The rack assembly 22 and elevator tray 64 allow the GAEMES magazine to be preloaded with PGMs, artillery rocket/missiles, or cruise missile rounds for a variety of dissimilar missions during the same flight. For example, some TLAM rounds carried in MECs may have a unitary war head, while others may be configured to dispense cluster munitions. Harpoon missiles, SLAM's, or torpedoes may be loaded in a mixed configuration so that anti-ship, anti-submarine, and land-attack munitions can be launched during the same mission. Potential ground attack loads also include Mk 82, 83 or 84 GP bombs with laser guidance or GPS kits, and cluster bomb units (CBU) with GPS guidance kits (i.e., wind corrected munition dispensers). An advantage to launching CBUs from the MECs is that their shorter length allows more than one CBU to be packaged in a single MEC. For example, two CBUs can fit within one 22 inch wide, 16 foot long MEC, and four CBUs can be packed within a 28 foot long MEC. When multiple CBUs are dispensed from the same MEC, each can be given a separate GPS coordinate for optimal coverage, yet all will arrive at the same time, just as if they were ripple released from a fighter or bomber aircraft. The use of multiple munitions in a single MEC also applies to MK 82 or MK 83 GPS guided GP bombs. The smaller diameter and tapered shape of these munitions makes it possible to package them with overlapping nose and tail sections, so that up to three weapons can be packaged in a short MEC, and six or more weapons can be packaged within a long MEC. An example of the packaging arrangement of multiple munitions 31 within a single MEC 30 is shown in FIGS. 13B and 13C. The ability to employ multiple munitions from a single MEC, with up to 30 MECs carried within the CAEMES unit, allows a C-130 or C-141 aircraft to not only carry a similar number of munitions as a B-52, B-1 or B-2 bomber, but also the ability to carry a larger variety of munitions during the same mission, In a preferred embodiment, the CAEMES unit 12 is provided with four height adjustable, steerable wheels 90 located on the four corners of the unit. At least two of the wheels 90 are driven by electric motors 92 powered by a self-contained battery power supply 94. This facilitates loading and unloading of the CAEMES unit 12 from the aircraft. The batteries 94 are also used to power a central processor unit (CPU) 96 which is used to confirm the status of upload munitions, where they are stored in the unit 12, and the unit's weight and balance. The avionics to support the PGMs carried in the CAEMES unit 12 are contained in a large avionics module 100 on the aft section 18. The avionics module 100 "black boxes" used to support the PGMs carried in the CAEMES unit are mounted on multiple racks in the aft section 18 for easy access. Likewise, the battery power supply 94 is mounted in a manner which provides easy access. The avionics module 100 is further provided with means to permit removal and replacement for maintenance or mission planning.

Referring to FIGS. 3 and 9–15, the MEC 30 is shown in accordance with several embodiments. As discussed above, the MEC 30 functions strictly as a storage container for one or more munitions and consists primarily of a longitudinal side wall structure 32, a forward end plate 34, an aft plate 36, and packing inserts 38.

In a first embodiment, shown in FIGS. 3 and 9–12, the longitudinal side wall structure 32 includes four independent side panels 110, including a top panel A, a bottom panel B, and left and right panels C and D, which fit together at right angles to form a rectangular box having open ends at the front and rear. The longitudinal edges of the side panels attach by tongue and groove construction to provide increased integrity. Specifically, tongue portions 116 along one longitudinal edge 112 of each side panel fit within grooves 118 of correspondingly positioned longitudinal side edges 114 of adjacent panels. The forward end plate 34 and rear end plate 36 are releasably attachable to the respective forward and rear open ends of the longitudinal side wall structure 32. The aft end plate 36 mates with the rear end of the side wall structure 32, using a tongue and groove structure. Specifically, the inner face 120 of the aft end plate 36 is provided with a tongue portion 122 which extends about the periphery of the inner face. The tongue portion 122 on the aft end plate is specifically sized and configured for mating receipt within groove portions 124 on the rear end edges 126 of the side panels 110 of the longitudinal side wall structure 32 in the same manner as described and illustrated in connection with FIGS. 9 and 11. The side panels 110 are further provided with four frangible fingers 130 having frangible male locking tabs 132 at their distal ends for interlocking receipt within correspondingly positioned holes 134 or female notches formed in the aft end plate 36, thereby facilitating interlocked attachment of the aft plate 36 to the rear end of the side wall structure 32. To pack one or more munitions 31 within the MEC 30, the munition 31 is first placed on a bottom panel B of the side wall structure and the form fitting packing inserts 38 are placed in position, surrounding the munition 31, thus forming a rectangular block. The aft end plate 36 is then inserted into position on the rear end of the bottom side panel B so that the tongue and groove members 122, 124 on the aft end plate and the end of the bottom panel B mesh together, and the frangible male locking tab 132 on the finger 130 extending from the upper side of the bottom side panel interlocks within the respectively aligned hole 134 or female notch on the aft end plate 36. This process is repeated three more times, with the longitudinal tongue and groove portions 116, 118 of the side panels A–D joining together as each of the side panels A–D are fitted to the aft end plate, so that the frangible male locking tabs 132 on the protruding fingers 130 interlock with the aft end plate 36. When all fourside panels have been installed, the forward end plate 34 is ready for installation. The forward end plate 34 fits several inches inside of the front edges 111 of the side panels 110. The interlocking means 40 is fitted to the inside face 140 of the forward end plate 34 and includes four radial fingers 142 which engage within four correspondingly positioned loops 144 on the inner facing sides 146 of the four side panels 110. The four radial fingers 142 mate within the corresponding side panel loops 144, locking them into place. The radial fingers 142 are spring loaded with a time release catch 148 which rotates the radial fingers 142 between a locked position, within the side panel loops 144 and the unlocked position to permit release of the forward end plate 34 from the front end of the MEC 30. Should the radial fingers 142 unlock accidentally, the MEC 30 will remain in tact unless outward pressure is exerted on the four side panels 110. When all four side panels 110, and the aft end plate 36 is secured, the MEC remains in tact so that it can be ejected from the CAEMES unit 12 without jamming. Jamming is further prevented by the configuration of the ejection ramp 60 which holds the MEC 30 together until it is free of the aircraft.

To facilitate communication and programming with the guidance system of the munition(s) stored in the MEC, an electrical umbilical cord 90 runs from the munition(s) 31 to a male/female internal/external receptacle 88 on the forward end plate 34. This receptacle facilitates an electrical connection between the loaded munition(s) and the CAEMES avionics modules, thereby enabling programming of the munition(s) in flight prior to ejection (if required). For instance, the guidance system of the munition(s) can be programmed with flight plans, GPS coordinates, and other vital data just prior to launching the munitions 31 from the aircraft.

Figure 12:
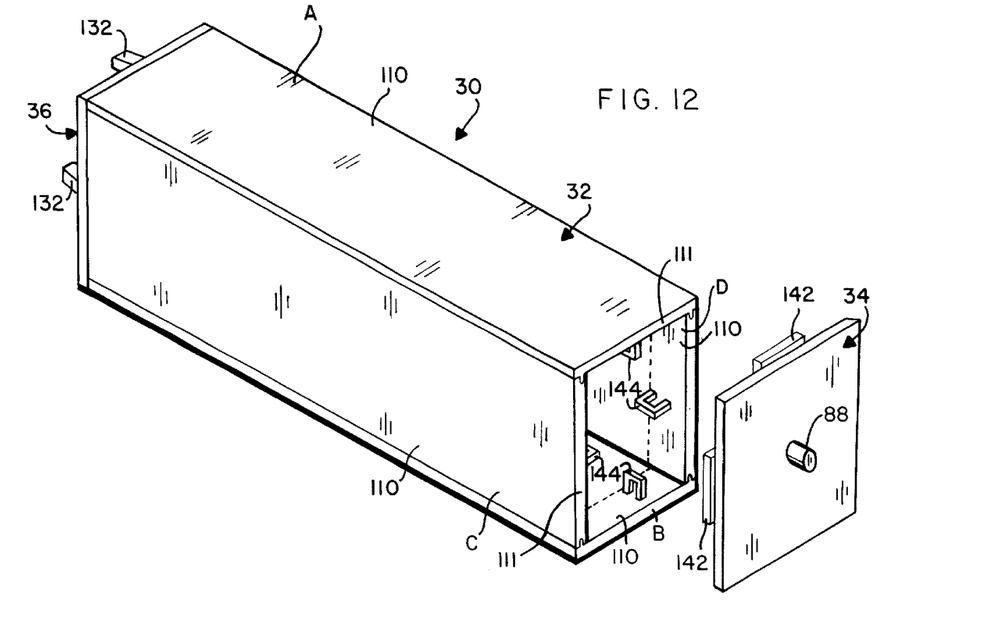
FIG. 12 is a partially exploded perspective view of the munition ejection container according to the embodiment of FIG. 3.
Figure 12A:
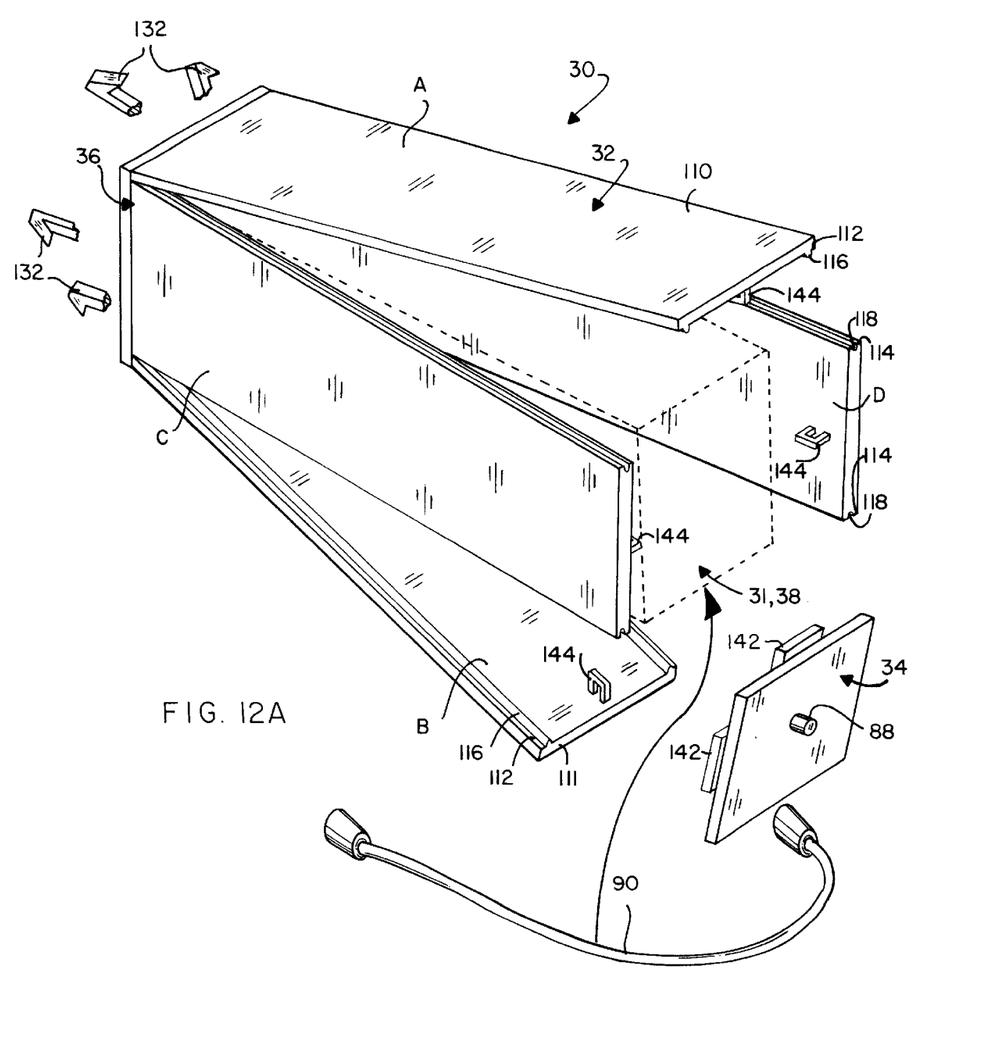
FIG. 12A is a perspective view of the munition ejection container of FIG. 12, illustrating the manner of separation and removal of the munition ejection container after the container is launched from an aircraft.

When the MEC 30 is ejected from the ejection ramp 60, a preset time delay is activated. After ejection, the front end of the MEC is subjected to an air blast of 200 plus knots. At the end of the time delay, a spring loaded mechanism activates the interlocking means 40 which then releases the four radial fingers 142 from locked position within the side panel loops 144, thereby permitting separation of the side panels 110 (A–D) from the forward end plate 34. The air pressure then causes the four side panels 110 to peel back from the block shaped contents (i.e., the packing inserts 38 and munition(s) 31) similar to petals unfolding from a flower, as seen in FIG. 12A. This process is aided by the frangible tabs 132 and the tongue and groove construction 122, 124 of the aft end plate. Specifically, the frangible male locking tabs 132 and tongue and groove construction 122, 124 keeps the panels 110 (A–D) locked in place with the aft end plate 36, while allowing the side panels A–D to swing outwardly as the grooves 124 at the rear edges of the side panels rotate about the tongues 122 on the aft end plate. As the air pressure causes the side panels A–D to bend back and outwardly relative to the forward end of the MEC 30, the side panels A–D separate from the munition 31 and packing inserts 38. This causes the packing inserts 38 and electrical umbilical cord 90 to be subjected to the high speed wind blast, resulting in separation of the packing inserts 38 and umbilical cord 90 from the munition(s) 31. At this stage, the munition(s) 31 is separated from the MEC and is then subject to the same aerodynamic environment as if it had been dropped from a fighter or bomber aircraft at the same launch altitude.

FIGS. 14–17 show an alternative embodiment of the MEC construction. Specifically, the side wall structure 32 and end plates are structured in two pieces, including a top piece 160 and a bottom piece 164. The top piece 160 is generally U-shaped, and includes a top panel 170 and opposite side panels 172, 174 integral with a tail section 176 which includes the aft panel 36. The tail section 176 includes a chamber for storing a parachute therein. The bottom piece 164 forms the fourth longitudinal side panel of the container. A front cover 34' is structured to snap onto the forward end of the container by using frangible locking tabs 180. To load the munition 31, the munition is first placed on the bottom piece 164. The packing inserts 38 are then placed about the munition to form a rectangular block. Next, the top piece 160, consisting of the side panels 172, 174, top panel 170, and tail section 176, is lowered over the munition 31 and packing inserts 38, and fastened to the bottom panel 164. The front cover 34' is then attached to the forward end of the container so that frangible locking tabs 180 on the inner face of the front cover snap into place within notches or female receptacles 182 on the inner faces of the side panels 172, 174 of the top and bottom pieces. A parachute 190, stowed in a compartment 192 in the tail section, is adapted to be deployed after a pre-set time delay once the MEC has been launched from the aircraft. This can be achieved with the use of a small explosive 196 contained in the compartment 192 which blasts the aft end plate 36 open to thereby release the parachute which remains anchored to the wall structure 32. When the time delay expires and the parachute opens, the resultant G-forces pull the top and bottom pieces of the MEC rearward relative to the munition, packing inserts and front cover, thereby causing the frangible tabs on the front cover to break. This pulls the top and bottom pieces off of the contents. After being exposed to the wind blast, the packing inserts surrounding the munition are blown away, and the munition 31 assumes an aerodynamic flight attitude, just as if it had been dropped from a fighter or a bomber. At this point, the munition(s) is ready for internal guidance commands to the target.

Figure 16:
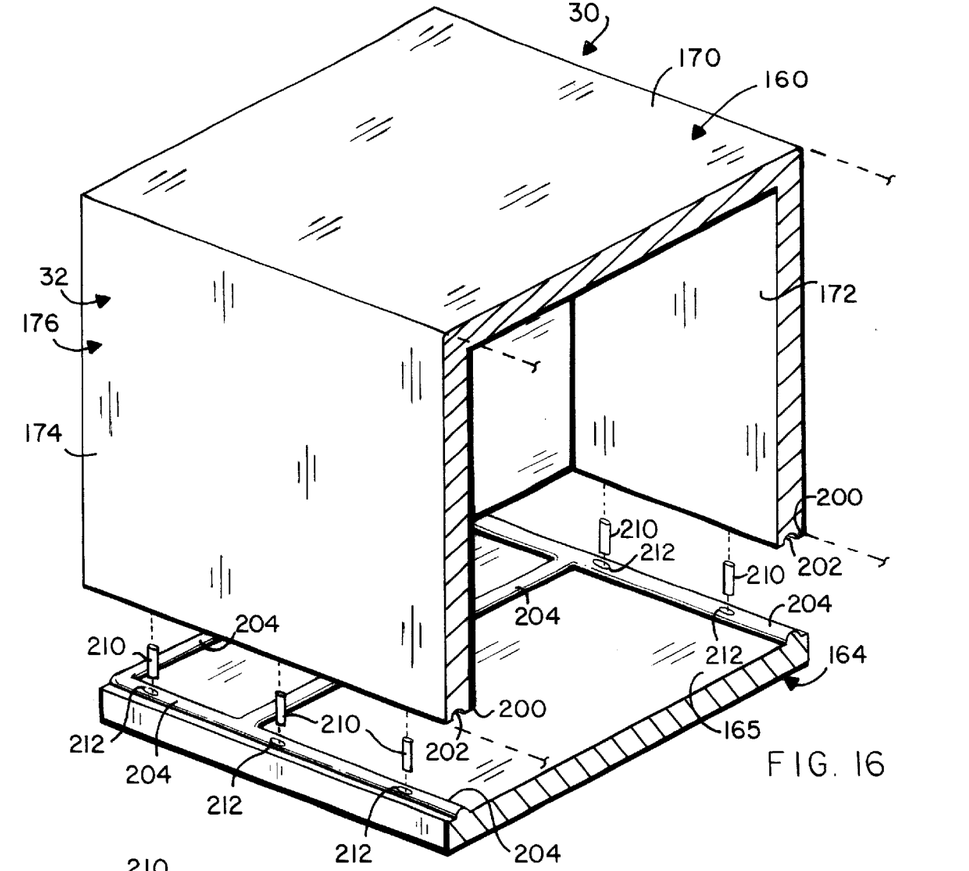
FIG. 16 is an isolated, perspective view, shown in partial cross section, illustrating the manner of attachment of a top portion to a bottom portion of the munition ejection container of the embodiment of FIGS. 14 and 15.
Figure 17:
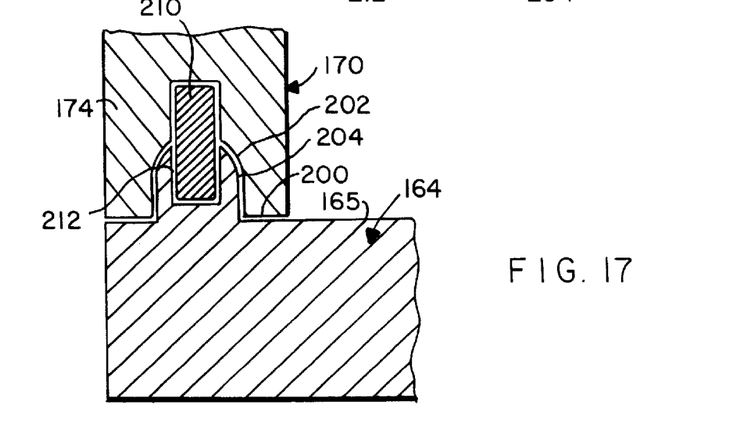
FIG. 17 is an isolated cross sectional view showing a detail of the tongue and groove attachment, using pins, to attach the top portion of the munition ejection container to the bottom portion of the munition ejection container in accordance with the embodiment of FIGS. 14–16.

Referring to FIGS. 16 and 17, the top piece 160 of the MEC is secured to the bottom piece 164 with use of tongue and groove construction. Specifically, the bottom edges 200 of the top piece 160 are provided with round grooves 202 for congruent receipt of tongue portions 204 formed about the periphery of the upper surface 165 of the bottom piece 164. The use of a tongue and groove attachment increases the strength of the container 30 when the top 160 and bottom 164 pieces are joined. The mating tongue and grooves may also be provided with vertically oriented pins or dowels 210 fitted within aligned holes 212 formed in the tongue and groove portions, thereby further increasing the strength of the container where the top and bottom pieces are joined together. The use of both the tongue and groove attachment structure and pins makes the joined top and bottom pieces resistant to longitudinal, lateral and twisting portions that may be experienced when the MEC is handled or ejected, while allowing the two pieces to be easily joined and fastened.

Figure 13A:
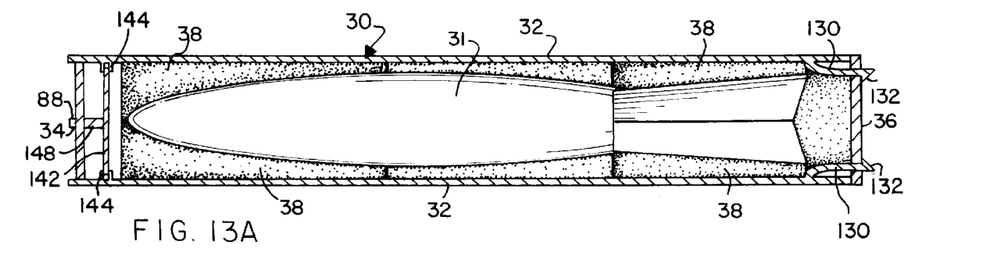
FIGS. 13A–13C are show side elevations, in partial cross section, illustrating various packing arrangements of one or more munitions within a single munition ejection container.
Figure 13B:
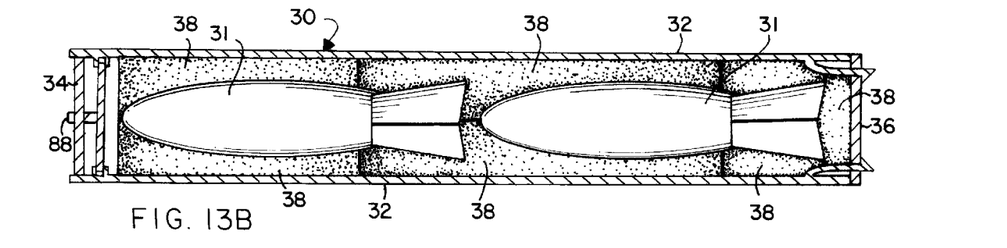
Figure 13C:
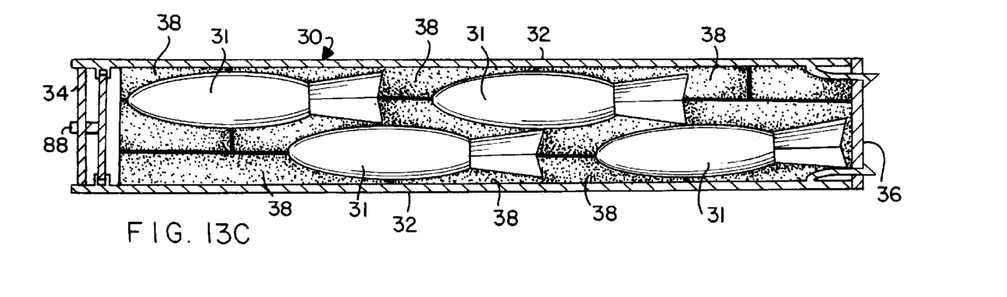
Figure 14:
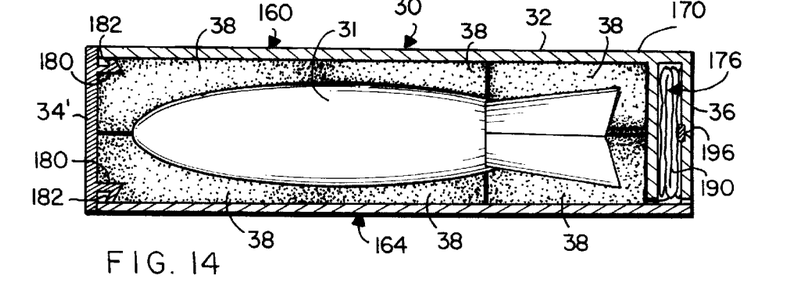
FIG. 14 is a side elevational view, in partial section, illustrating a munition packed within a munition container in accordance with a second preferred embodiment of the invention.
Figure 15:
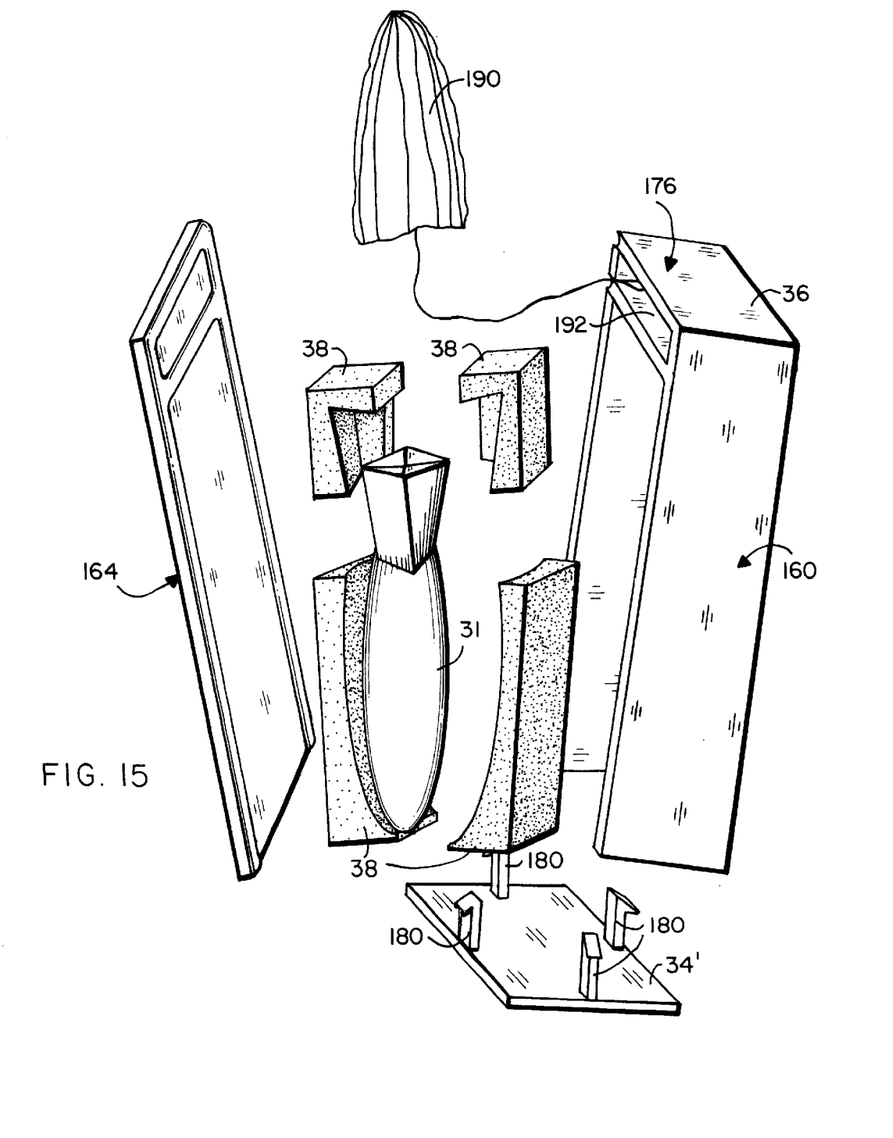
FIG. 15 is an exploded, perspective view showing the manner of separation of the munition ejection container of the embodiment of FIG. 14, to release the munition 31 therein after a container is launched from an aircraft.

Referring to FIGS. 13A–13C, several examples of weapon configurations are shown packed within the MEC 30. For instance, in FIG. 13A, a single munition 31 is packed and surrounded by the form fitting packing inserts 38, within the MEC. Alternatively, as seen in FIG. 13B, two smaller munitions 31 can be packed, nose to tail, within a single MEC. In yet another example, as seen in FIG. 13C, four smaller munitions 31 can be packed, nose over tail of adjacent munitions. As mentioned above, each of the munitions 31 stored in a single MEC 30 can be programmed with different flight plans and target coordinates. Once ejected from the aircraft, and after the MEC 30, including packing inserts 38, have been stripped from the munitions 31, each munition can assume its own independent flight plan towards a designated target. Naturally, on the other hand, the munitions 31 can all be programmed to hit the same target.

While the instant invention has been shown and described in accordance with several preferred and practical embodiments thereof, it is recognized that departures may be made from the instant disclosure which, therefore, should not be limited except as set forth in the following claims as interpreted under the doctrine of equivalents.

What is claimed is:

1. A system for launching munitions from an aircraft comprising:

at least one munition container for encapsulating one or more of the munitions, said munition container comprising:
  a surrounding wall structure including side walls and opposite end walls;
  packing means sized and configured for receipt within said surrounding wall structure for protectively surrounding and stabilizing the one or more munitions contained within said munition container; and
  securing means for holding said wall structure and said packing means in an assembled package in surrounding, encapsulating relation to said one or more missiles contained therein;
rack means positionable within the aircraft for holding said at least one munition container in a storage position therein;
launch means for selectively ejecting said at least one munition container from the aircraft;
container movement means for selectively moving said at least one munition container within said rack means to different storage positions and to said launch means, said container movement means including:
  vertical movement means for raising and lowering said at least one munition container within said rack means;
  longitudinal movement means for selectively moving said at least one munition container longitudinally within said rack means; and
  lateral movement means for selectively moving said at least one munition container laterally within said rack means;
means for releasing said securing means to cause said munition container, including said wall structure and said packing means, to be stripped from said one or more munitions encapsulated therein, after ejection of said munition container from the aircraft, thereby enabling the one or more munitions to assume an aerodynamic flight path.

2. The system as recited in claim 1 wherein said opposite end walls of said surrounding wall structure include a forward wall and an aft wall, and said surrounding side wall structure including an open forward end, said forward wall being structured and disposed for releasable attachment to said munition container in covering relation to said open forward end.

3. The system as recited in claim 2 wherein additionally positioned side walls of said munition container include correspondingly positioned longitudinal edges structured and disposed for aligned, mating attachment with one another to facilitate attachment of said adjacently positioned side walls.

4. The system as recited in claim 3 wherein said securing means includes tongue and groove means formed along said correspondingly positioned longitudinal edges of said adjacently positioned side walls for fitted, mating attachment of said correspondingly positioned longitudinal edges to thereby hold said side walls in surrounding relation to said one or more munitions contained within said munition container.

5. The system as recited in claim 3 wherein said securing means includes interlocking means for releasably securing said forward wall in attached position in covering relation to said open forward end of said munition container.

6. The system as recited in claim 5 wherein said means for releasing said securing means includes means for triggering said interlocking means after ejection of said munition container from the aircraft to release said forward end wall from attachment to said open forward end of said munition container.

7. The system as recited in claim 5 wherein said means for releasing said securing means includes drag inducing means for exerting a deceleration force on said munition container relative to said one or more munitions contained therein after ejection of said munition container from the aircraft.

8. The system as recited in claim 7 wherein said drag inducing means includes:
a parachute packaged within said munition container and being anchored to said wall structure; and
means for deploying said parachute from said munition container after ejection of said munition container from the aircraft, thereby causing said parachute to open and exert a drag force on the munition container.

9. The system as recited in claim 5 further comprising:
a mobile unit including a munitions storage compartment, said mobile unit being structured and disposed to be carried within the aircraft, and said munitions storage compartment including said rack means and said container movement means therein.

10. The system as recited in claim 9 wherein said rack means includes a plurality of tiers for holding a plurality of said munition containers in predetermined storage positions.

11. A system for launching munitions from an aircraft comprising:
at least one munition container for encapsulating one or more of the munitions, said munition container comprising:
a surrounding wall structure including side walls and opposite end walls;
packing means sized and configured for receipt within said surrounding wall structure for protectively surrounding and stabilizing the one or more munitions contained within said munition container; and
securing means for holding said wall structure and said packing means in an assembled package in surrounding, encapsulating relation to said one or more missiles contained therein;
rack means positionable within the aircraft for holding said at least one munition container in a storage position therein;
launch means for selectively ejecting said at least one munition container from the aircraft;
container movement means for selectively moving said at least one munition container within said rack means to different storage positions and to said launch means, said container movement means including:
vertical movement means for raising and lowering said at least one munition container within said rack means;
roller means structured for rolling engagement with said at least one munition container for moving said at least one munition container within said rack means and said roller means including a plurality of bidirectional motor-driven rollers for forcibly directing movement of said at least one munition container within said rack means, and said plurality of motor-driven rollers further facilitating transfer of said at least one munition container from said rack means to said launch means; and
means for releasing said securing means to cause said munition container, including said wall structure and said packing means, to be stripped from said one or more munitions encapsulated therein, after ejection of said munition container from the aircraft, thereby enabling the one or more munitions to assume an aerodynamic flight path.

12. The system as recited in claim 11 wherein said securing means includes tongue and groove means formed along correspondingly positioned longitudinal edges of adjacently positioned side walls for fitted, mating attachment of said correspondingly positioned longitudinal edges to thereby hold said side walls in surrounding relation to said one or more munitions contained within said munition container.

13. The system as recited in claim 11 wherein said securing means includes interlocking means for releasably securing said forward wall in attached position in covering relation to said open forward end of said munition container.

14. The system as recited in claim 13 wherein said means for releasing said securing means includes means for triggering said interlocking means after ejection of said munition container from the aircraft to release said forward end wall from attachment to said open forward end of said munition container.

15. The system as recited in claim 13 wherein said means for releasing said securing means includes drag inducing means for exerting a deceleration force on said munition container relative to said one or more munitions contained therein after ejection of said munition container from the aircraft.

16. The system as recited in claim 15 wherein said drag inducing means includes:
a parachute packaged within said munition container and being anchored to said wall structure; and
means for deploying said parachute from said munition container after ejection of said munition container from the aircraft, thereby causing said parachute to open and exert a drag force on the munition container.

17. The system as recited in claim 13 further comprising:
a mobile unit including a munitions storage compartment, said mobile unit being structured and disposed to be carried within the aircraft, and said munitions storage compartment including said rack means and said container movement means therein.

18. The system as recited in claim 17 wherein said rack means includes a plurality of tiers for holding a plurality of said munition containers in predetermined storage positions.

19. A system for launching munitions from an aircraft comprising:

a munition container for encapsulating one or more of the munitions, said munition container comprising:
  a wall structure surrounding an interior chamber and including an aft wall, side walls extending between an open forward end and said aft wall, and a forward end wall attachable to said side walls for covering said open forward end of said munition container and surrounding an interior chamber;
  packing means sized and configured for receipt within said interior chamber for protectively surrounding and stabilizing the one or more munitions contained therein;
  securing means for holding said wall structure and said packing means in an assembled package in surrounding, encapsulating relation to said one or more munitions contained therein and including interlocking means for releasably securing said forward end wall in attached position in covering relation to said open forward end of said munition container;

a mobile unit including a munitions storage compartment, said mobile unit being structured and disposed to be carried within the aircraft;

rack means including a plurality of tiers for holding one or more of said munition containers in a storage position on one of said tiers;

container movement means for moving said munition containers within said rack means and including:
  lift means for raising and lowering said munition containers between said plurality of tiers;
  multi-directional movement means on said lift means for selectively moving said munition containers longitudinally and laterally;
  lateral movement means on each of said tiers for moving said munition containers laterally on said respective tiers; and
  said multi-directional movement means and said lateral movements means cooperating with each other to facilitate transferring said munition containers between said lift assembly and each of said respective tiers;

launch means communicating with said container movement means for selectively ejecting said munition containers from the aircraft; and means for releasing said securing means to cause said munition container, including said wall structure and said packing means, to be stripped from said one or more munitions encapsulated therein, after ejection of said munition container from the aircraft, thereby enabling the one or more munitions to assume an aerodynamic flight path.

20. A system for launching munitions from an aircraft comprising:

a plurality of munition containers, each of said plurality of munition containers being structured for encapsulating one or more of the munitions, and each of said plurality of munition containers comprising:
  a surrounding wall structure;
  packing means sized and configured for receipt within said surrounding wall structure for protectively surrounding and stabilizing the one or more munitions contained within said munition container;
  securing means for holding said wall structure and said packing means in an assembled package in surrounding, encapsulating relation to said one or more munitions contained therein;

rack means positionable within the aircraft for holding said plurality of munition containers in storage positions therein;

launch means for selectively ejecting any one or more of said plurality of munition containers from the aircraft in any desired sequence;

container movement means for selectively moving said plurality of munition containers within said rack means, and said container movement means being structured and disposed for selectively moving any of said plurality of munition containers to different storage positions within said rack means, and said container movement means being further structured and disposed for selectively moving any one or more of said plurality of munition containers from said rack means to said launch means in accordance with any desired sequence; and means for releasing said securing means to cause said munition container to be stripped from the one or more munitions encapsulated therein after ejection of said munition container from the aircraft, thereby enabling the one or more munitions to assume an aerodynamic flight path.

\* \* \* \* \*